US008072620B2

(12) United States Patent
Yamamoto et al.

(10) Patent No.: US 8,072,620 B2
(45) Date of Patent: Dec. 6, 2011

(54) ELECTRONICALLY TAGGED PRINTED MATTER, IMAGE FORMING DEVICE, IMAGE FORMING METHOD, AND IMAGE FORMING PROGRAM, AS WELL AS COMPUTER READABLE RECORDING MEDIUM ON WHICH THE PROGRAM IS RECORDED

(75) Inventors: Kazuto Yamamoto, Kunitachi (JP); Masakatsu Kiwada, Sagamihara (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 13/085,913

(22) Filed: Apr. 13, 2011

(65) Prior Publication Data

US 2011/0188081 A1 Aug. 4, 2011

Related U.S. Application Data

(62) Division of application No. 10/800,733, filed on Mar. 16, 2004, now Pat. No. 7,961,337.

(30) Foreign Application Priority Data

Dec. 26, 2003 (JP) ................................ 2003-435732

(51) Int. Cl.
*G06K 15/00* (2006.01)
*G06K 15/16* (2006.01)

(52) U.S. Cl. ..................... 358/1.12; 358/1.13; 358/1.15; 235/487; 235/492; 340/572.1; 340/572.4; 399/361; 399/367

(58) Field of Classification Search ................. 358/1.12, 358/1.13, 1.15; 235/487, 492; 340/572.1, 340/572.4; 399/361, 367
See application file for complete search history.

(56) References Cited

U.S. PATENT DOCUMENTS 5,974,202 A * 10/1999 Wang et al. .................. 382/306
(Continued)

FOREIGN PATENT DOCUMENTS

JP 3-175075 7/1991
(Continued)

OTHER PUBLICATIONS

Notification of Reason for Refusal dated Feb. 28, 2006 issued in JP 2003-435732.

*Primary Examiner* — King Poon
*Assistant Examiner* — Lawrence Wills
(74) *Attorney, Agent, or Firm* — Buchanan Ingersoll & Rooney PC

(57) ABSTRACT

In IC-tagged printed matter 200, image data is printed on IC-tagged paper and the image data of the printed image is stored in the IC tag. MFP 100C makes a judgment whether the document set by ADF 141 is an IC-tagged printed matter or not by means of IC tag reader 143A, reads out the image data from the IC tag of the document on the ADF by means of IC tag reader 143A without transporting the document, and prints it on conventional paper or IC-tagged printing paper by means of printing unit 151, when it is the IC-tagged printed matter. If it is to be printed on IC-tagged printing paper, it writes the printed image data on the IC tag of said IC-tagged printing paper by means of IC tag writer 152 simultaneously. Thus, high quality copies in which the attribute information of the printed matter is reflected can be obtained from the electronically tagged printed matter.

15 Claims, 10 Drawing Sheets

U.S. PATENT DOCUMENTS 6,827,279 B2 * 12/2004 Teraura ........................ 235/492
7,048,194 B2 5/2006 Minami et al.
7,428,067 B2 9/2008 Kiwada
7,450,253 B2 11/2008 Kiwada
2004/0075867 A1 4/2004 Watanabe et al.
2004/0109194 A1 6/2004 Yano
2005/0078335 A1 * 4/2005 Morris-Jones .............. 358/1.15
2005/0141004 A1 6/2005 Kiwada
2005/0141009 A1 6/2005 Kiwada
2005/0162697 A1 7/2005 Kiwada

FOREIGN PATENT DOCUMENTS

JP 10-334215 12/1998
JP 2001-024845 1/2001
JP 2002-209039 7/2002
JP 2002-337426 11/2002

* cited by examiner

Figure 4:
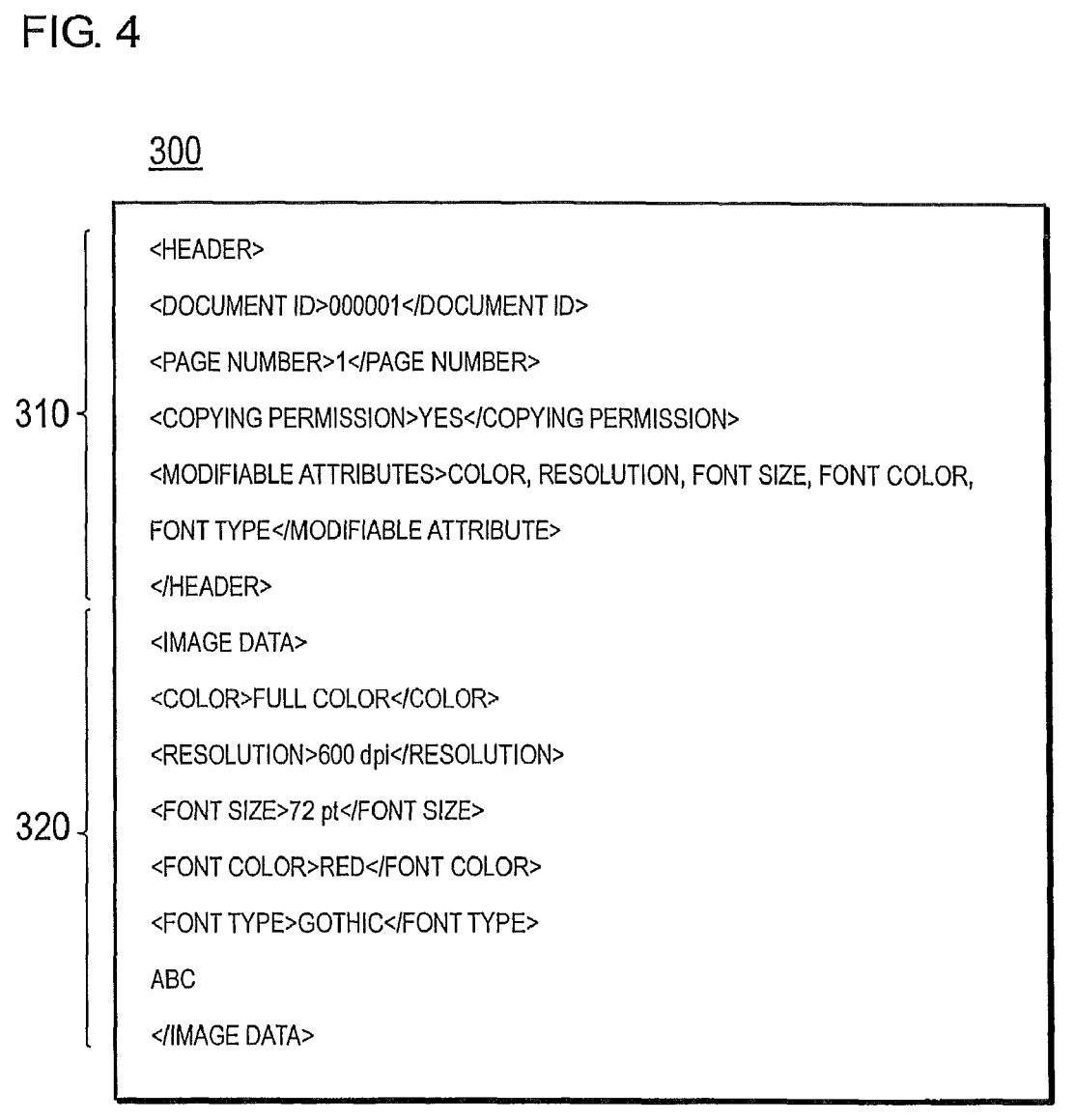

<HEADER>
<DOCUMENT ID>000001</DOCUMENT ID>
<PAGE NUMBER>1</PAGE NUMBER>
<COPYING PERMISSION>YES</COPYING PERMISSION>
<MODIFIABLE ATTRIBUTES>COLOR, RESOLUTION, FONT SIZE, FONT COLOR, FONT TYPE</MODIFIABLE ATTRIBUTE>
</HEADER>

320

<IMAGE DATA>
<COLOR>FULL COLOR</COLOR>
<RESOLUTION>600 dpi</RESOLUTION>
<FONT SIZE>72 pt</FONT SIZE>
<FONT COLOR>RED</FONT COLOR>
<FONT TYPE>GOTHIC</FONT TYPE>
ABC
</IMAGE DATA>

Figures 9, 10:
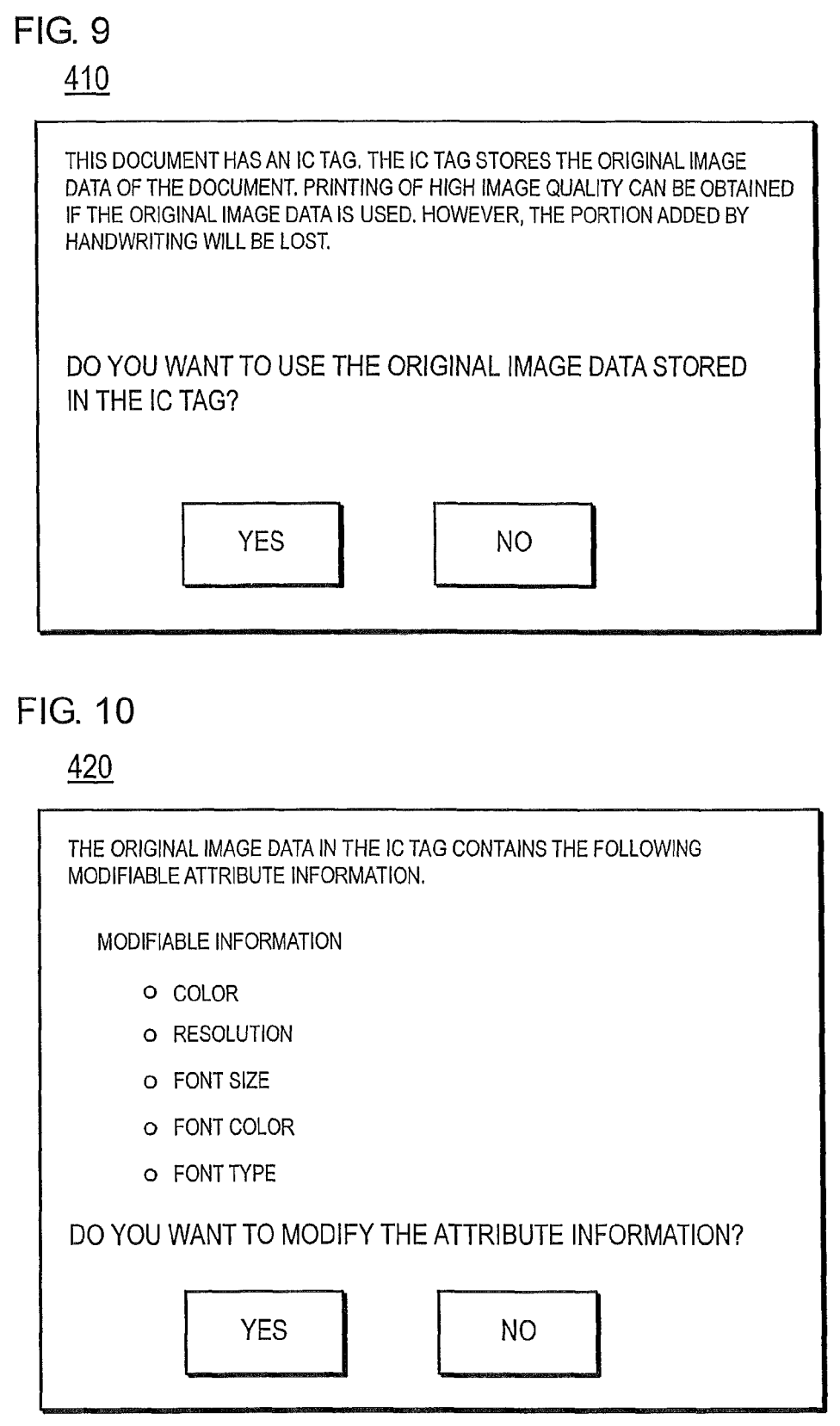

THIS DOCUMENT HAS AN IC TAG. THE IC TAG STORES THE ORIGINAL IMAGE DATA OF THE DOCUMENT. PRINTING OF HIGH IMAGE QUALITY CAN BE OBTAINED IF THE ORIGINAL IMAGE DATA IS USED. HOWEVER, THE PORTION ADDED BY HANDWRITING WILL BE LOST.

DO YOU WANT TO USE THE ORIGINAL IMAGE DATA STORED IN THE IC TAG?

YES NO

THE ORIGINAL IMAGE DATA IN THE IC TAG CONTAINS THE FOLLOWING MODIFIABLE ATTRIBUTE INFORMATION.

MODIFIABLE INFORMATION

- COLOR
- RESOLUTION
- FONT SIZE
- FONT COLOR
- FONT TYPE

DO YOU WANT TO MODIFY THE ATTRIBUTE INFORMATION?

YES NO

Figure 11:
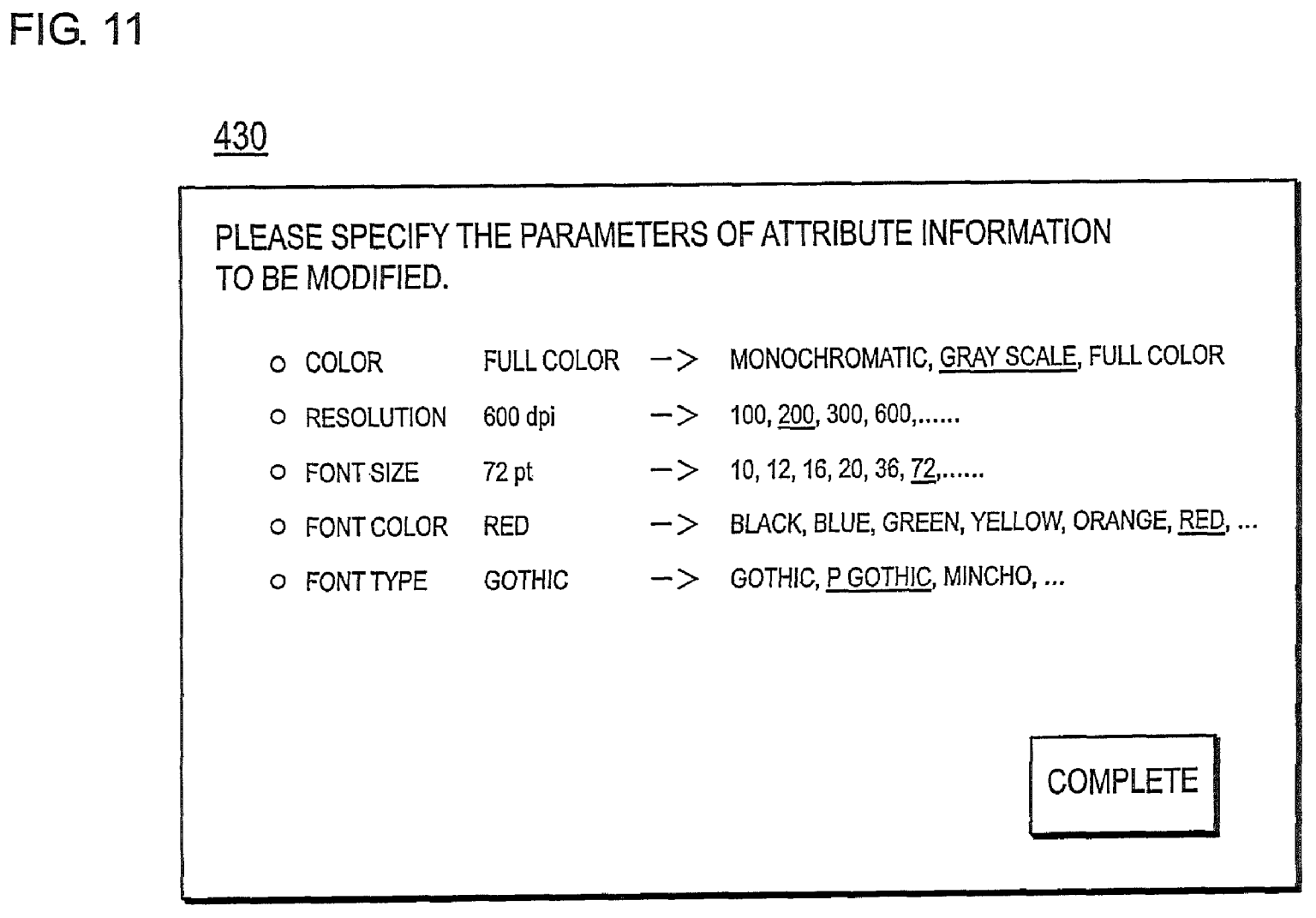

PLEASE SPECIFY THE PARAMETERS OF ATTRIBUTE INFORMATION TO BE MODIFIED.

- COLOR FULL COLOR —> MONOCHROMATIC, GRAY SCALE, FULL COLOR
- RESOLUTION 600 dpi —> 100, 200, 300, 600,......
- FONT SIZE 72 pt —> 10, 12, 16, 20, 36, 72,......
- FONT COLOR RED —> BLACK, BLUE, GREEN, YELLOW, ORANGE, RED, ...
- FONT TYPE GOTHIC —> GOTHIC, P GOTHIC, MINCHO, ...

COMPLETE

ELECTRONICALLY TAGGED PRINTED MATTER, IMAGE FORMING DEVICE, IMAGE FORMING METHOD, AND IMAGE FORMING PROGRAM, AS WELL AS COMPUTER READABLE RECORDING MEDIUM ON WHICH THE PROGRAM IS RECORDED

This application is based on Japanese Patent Application No. 2003-435732 filed on Dec. 26, 2003, the contents of which are hereby incorporated by reference.

BACKGROUND OF THE INVENTION

1. Field of the Invention

The invention relates to a printed matter equipped with an electronic tag and an image forming device for copying them or other purposes, in particular, a electronically tagged printed matter and an image forming device capable of allowing the user to use attribute information of the printed matter or original image data during copying.

2. Description of Related Art

Printed matters that hold the attribute information thereof on themselves by using printing paper with an IC tag, which is embedded in a certain part of printing paper, and image forming devices that allow the users to use the attribute information by reading it from the IC tag during the printing process have been known (e.g., JP-2001-24845A). These printing matters and devices are capable of providing outputs that reflect attribute information of the printed matters during copying, for example, overlaying noises on printed matters when there is information that prohibits copying. However, since said printed matters and devices are based on the optical copying technology, there are inherent problems, e.g., deterioration of images of copies.

Various image forming devices that read identifiers attached to the printed matter when copying the printed matter, and download from a server corresponding original image data for printing (e.g., JP-2002-209039A). Such devices can maintain image quality on copies equivalent to that of the original printed matter as the original image data for the printed matter can be used on copies. However, said devices can be used only under environments where dedicated servers, networks and other facilities are built in.

In the meanwhile, certain recording media such as IC cards have been known wherein image data recorded on said recording media are printed on the surfaces of the substrates (e.g., JP-10-334215A). However, the image on the surfaces of the substrates of those recording media are printed simply for the purpose of easy visual recognitions of the image data recorded on said recording media, and they don't have sufficient characteristics for being distributed as printed matters or to be copied.

SUMMARY OF THE INVENTION

The present invention is made in consideration of those problems of the prior art mentioned above, and is intended to provide a electronically tagged printed matter that enables the users to use attribute information thereof and original image data during printing and an image forming device for making said printed matter, and an image forming device that makes it possible to obtain from the electronically tagged printed matter copies of high qualities on which attribute information of the printed matter is reflected.

Said objective of the present invention can be accomplished by the following means:

(1) An electronically tagged printed matter wherein image data is printed on an electronically tagged printing paper equipped with an electronic tag for storing electronic data in a certain part of the printing paper, and said electronic tag stores image data printed on said electronically tagged printing paper.

(2) An image forming device comprising: a printing unit for printing image data on an electronically tagged printing paper equipped with an electronic tag for storing electronic data in a certain part of the printing paper, and a writing unit for writing the image data printed by said printing unit on said electronic tag.

(3) An image forming device, comprising: a reading unit for reading image data from an electronically tagged printed matter wherein image data is printed on an electronically tagged printing paper equipped with an electronic tag for storing electronic data in a certain part of the printing paper and said electronic tag stores image data printed on said electronically tagged printing paper; and a printing unit for printing the image data read by said reading unit.

(4) An image forming method comprising: a printing step of printing image data on an electronically tagged printing paper equipped with an electronic tag for storing electronic data in a certain part of the printing paper, and a writing step of writing the image data printed by said printing unit on said electronic tag.

(5) An image forming method, comprising: a reading step of reading image data from an electronically tagged printed matter wherein image data is printed on an electronically tagged printing paper equipped with an electronic tag for storing electronic data in a certain part of the printing paper and said electronic tag stores image data printed on said electronically tagged printing paper; and a printing step of printing the image data read by said reading step.

(6) An image forming program for causing an image forming device to execute: a printing step of printing image data on an electronically tagged printing paper equipped with an electronic tag for storing electronic data in a certain part of the printing paper, and a writing step of writing the image data printed by said printing unit on said electronic tag.

(7) An image forming program for causing an image forming device to execute: a reading step of reading image data from an electronically tagged printed matter wherein image data is printed on an electronically tagged printing paper equipped with an electronic tag for storing electronic data in a certain part of the printing paper and said electronic tag stores image data printed on said electronically tagged printing paper; and a printing step of printing the image data read by said reading step.

(8) A computer readable recording medium on which the image forming program as described in (6) is recorded.

(9) A computer readable recording medium on which the image forming program as described in (7) is recorded.

BRIEF DESCRIPTION OF THE DRAWINGS

FIG. 4 is a diagram for describing electronic data recorded on an IC tag 212 of IC-tagged document 200.

FIG. 9 is an example screen to be displayed on a touch panel of operating unit 130 of MFP 100C.

FIG. 10 is an example screen to be displayed on a touch panel of operating unit 130 of MFP 100C.

FIG. 11 is an example screen to be displayed on a touch panel of operating unit 130 of MFP 100C.

DESCRIPTION OF THE PREFERRED EMBODIMENTS

The preferred embodiments of the invention will be described in detail below with reference to the accompanying drawings.

Figure 1:
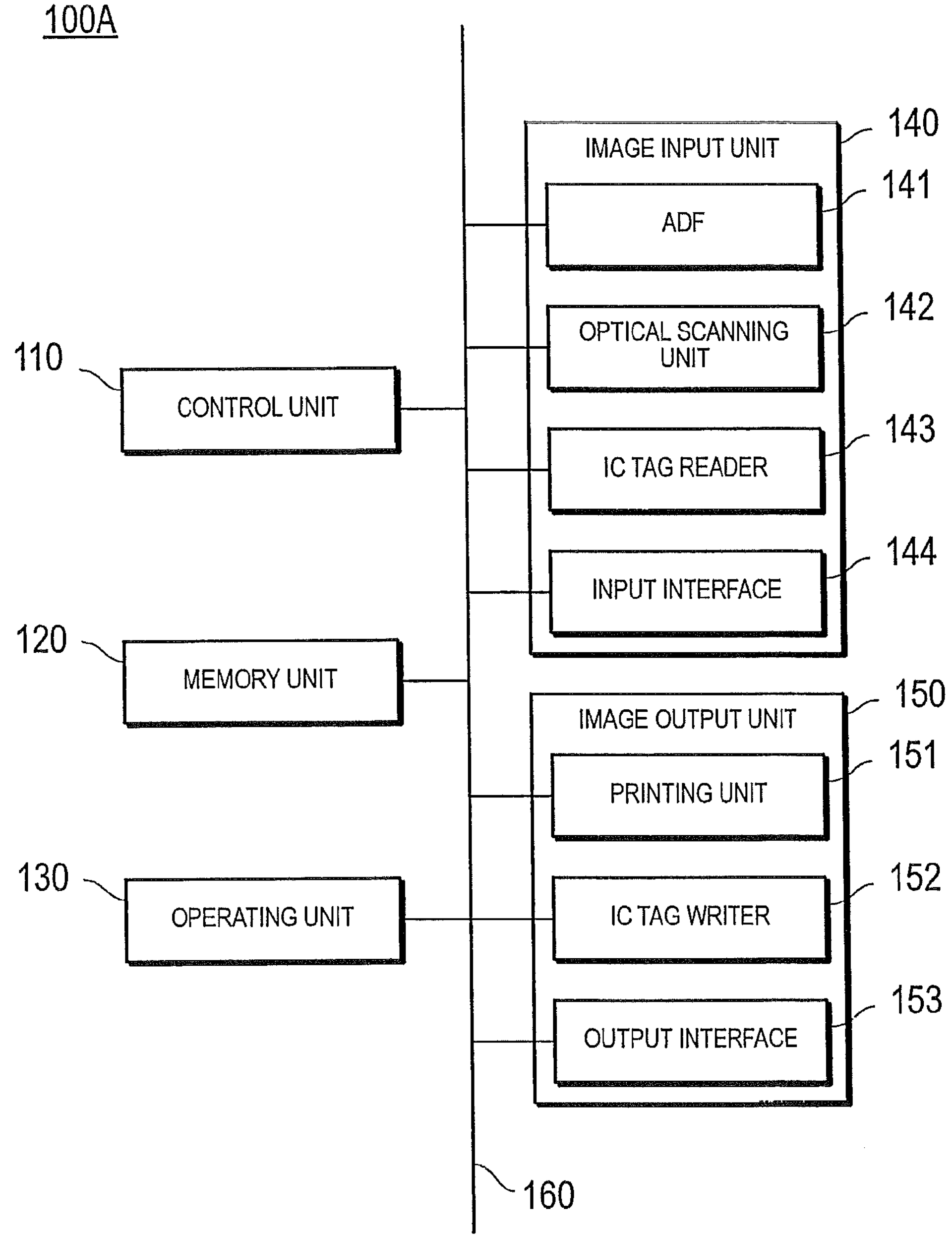
FIG. 1 is a block diagram showing the constitution of MFP 100A according to a first embodiment of the invention.
Figure 2:
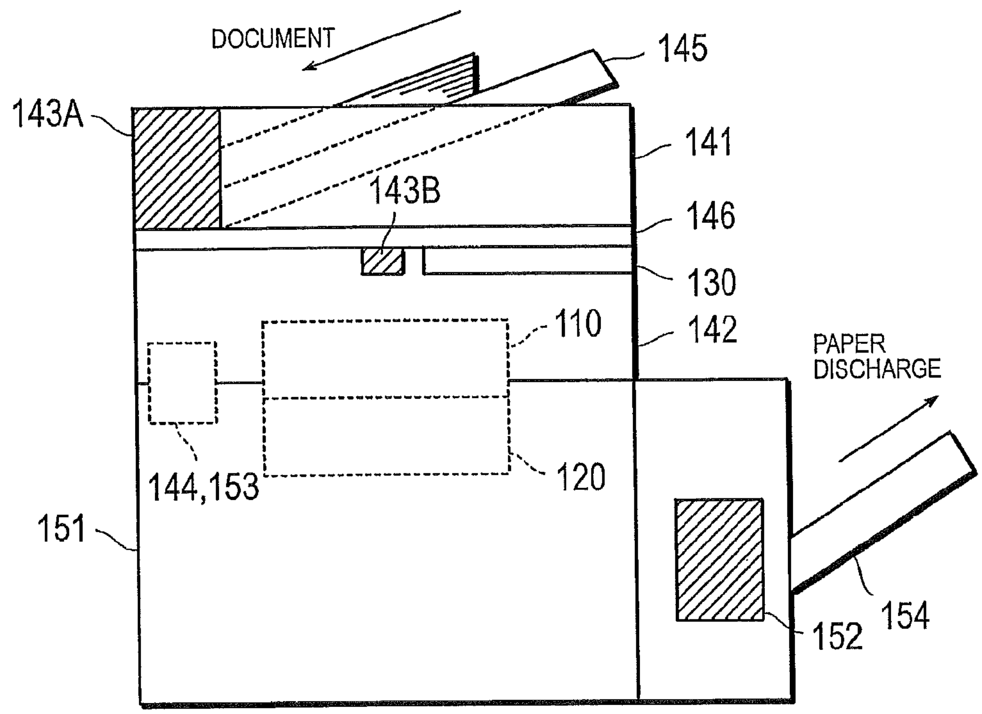
FIG. 2 is a block diagram showing the constitution of, MFP 100A.

FIG. 1 and FIG. 2 are the block diagram and the schematic diagram of MFP (Multiple Function Peripheral) 100A as an image forming device of the first embodiment of the present invention. As can be seen from FIG. 1 and FIG. 2, MFP 100A is equipped with a control unit 110, a memory unit 120, an operating unit 130, an image input unit 140, and an image output unit 150, all of which are interconnected to exchange signals with each other via bus 160.

The control unit 110 is a CPU, and controls various parts indicated above and executes various arithmetic processes according to a program.

The memory unit 120 includes a ROM for storing various programs and parameters, a RAM for temporarily storing programs and data, a hard disk used for storing various programs and data, or temporarily storing image data obtained from image processing, and others.

Operating unit 130 consists of a touch panel for displaying various information and entering various setup inputs, a ten key pad for setting up the number of copies to make and others, a start key for instructing the start of operation, a stop key for instructing the operation to stop, various fixed keys such as a reset key for initializing various setup conditions, indicator lamps, etc.

Image input unit 140 consists of an ADF (Auto Document Feeder) 141, an optical scanning unit 142, an IC tag reader 143, an input interface 144, etc.

ADF 141 transports a single or multiple sheets of paper set on document tray 145, transports them one sheet at a time to a specified scanning position of document table 146, and discharges the document sequentially after scanning it.

Optical scanning unit 142 irradiates a document set on the specified scanning position of document table 146 or transported to the location by the ADF with a light source such as a fluorescent lamp and the like, converts reflected lights from the document surface into electrical signals with the help of light sensitive devices such as CCD or CIS, and generates image data (bitmap data) from the electrical signals.

IC tag reader 143 reads the electronic data recorded on the non-contacting type IC tag of the IC-tagged document to be described later. As the communication system between IC tag reader 143 and the IC tag, those of the international standards such as ISO 14443 and ISO 15693 can be applied using frequency bands such as 135 kHz, 13.56 MHz, and 2.45 GHz. However, the communication systems that can be applied are not limited to those mentioned above, and other known communication systems or proprietary communication systems may be used. The IC tag reader may be able to read all the electronic data recorded on a plurality of IC tags within the communicable range simultaneously.

IC tag reader 143A reads the electronic data recorded on the non-contacting type IC tag of the IC-tagged document set on document tray 145. In order to prevent IC tag reader 143A from detecting by mistake IC tags existing in the vicinity of MFP 100A, other than the tags of the IC-tagged document set on document tray 145, it is designed specifically for short distance communications within a proper distance range, for example, within several centimeters to several tens of centimeters.

IC tag reader 143B reads electronic data recorded on non-contacting type IC tags of the IC-tagged document transported to the specified scanning position of document table 146 by ADF 141. In order to prevent IC tag reader 143B from detecting by mistake IC tags existing in the vicinity of, but not mounted on the IC-tagged document transported to document tray 146 by ADF 141, it is designed specifically for short distance communications within a proper distance range, for example, within several millimeters to several tens of centimeters. A metallic plate is provided between ADF 141 and document table 146 to prevent wireless communications between them in such a way that IC tag reader 143A cannot detect the IC tags of the IC-tagged document on document table 146, while IC tag reader 143B cannot detect the IC tags of the IC-tagged document on document table 145.

Input interface 144 is an interface for receiving input such as image data from external equipment, for which local connection interfaces, e.g., network interfaces such as Ethernet®, Token Ring, and FDDI standards, serial interfaces such as USB and IEEE 1394, parallel interfaces such as SCSI, IEEE 1284, and wireless communication interfaces such as Bluetooth, IEEE 802.11, HomeRF, IrDA, as well as telephone circuit interfaces for connection to telephone circuits can be used.

Image output unit 150 consists of printing unit 151, IC tag writer 152, output interface 153, etc.

Printing unit 151 prints image data to printing paper by the electronic photography method through the steps of electric charging, exposure, development, transfer and fixing, and discharges the printed paper to a paper discharge tray 154.

IC tag writer 152 is used to write electronic data on non-contacting type IC tags on the IC-tagged printing paper to be described later. A device designed for short distance communications similar to the one for IC tag reader 143B is used as IC tag writer 152, and the system for communications between IC tag writer 152 and IC tags can be similar to the one used for IC tag readers 143A and 143B.

Output interface 153 is an interface for transmitting image files to external equipment and an interface similar to said input interface 144 can be used.

Because of the abovementioned constitutions, MFP 100A has all of the functions as a scanner for scanning the document and transmitting image data to external equipment, as a printer for printing the image data received from external equipment, as a copying machine for scanning the document image and printing it, and as a facsimile machine for receiving and transmitting image data through telephone circuits.

MFP 100A may contain constitutional elements other than those described above, or may not include a portion of the abovementioned elements. For example, image input unit 140 of MFP 100A must at least have but can only have input interface 144, and is not necessary to have optical scanning unit 142, ADF 141 or IC tag reader 143. Image output unit 150 does not necessarily have output interface 153.

Figure 3:
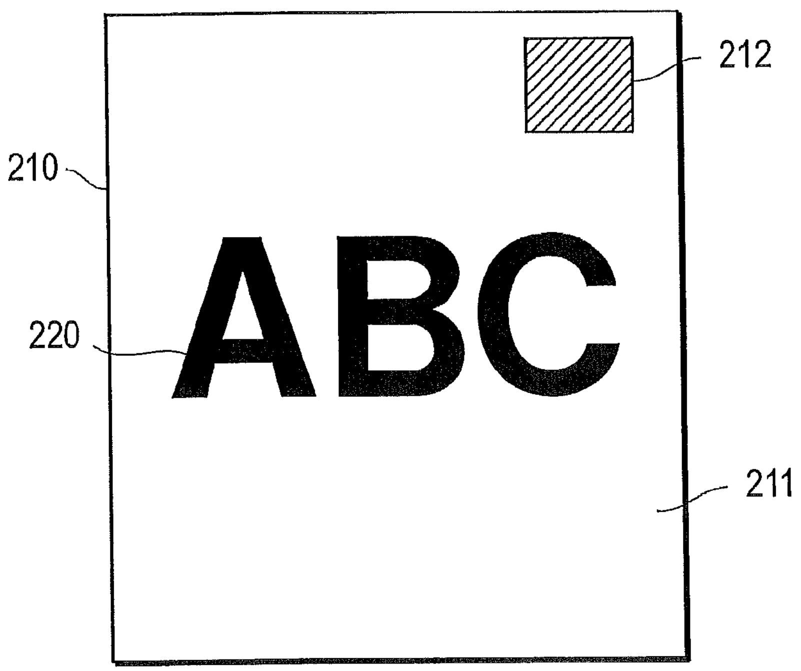
FIG. 3 is a schematic diagram showing a constitution of an IC-tagged document 200.

Next, let us describe the IC-tagged document according to this embodiment referring to FIG. 3 and FIG. 4. FIG. 3 is a schematic diagram showing a constitution of an IC-tagged document 200 according to this embodiment. As shown in FIG. 3, IC-tagged document 200 has an image 220 printed on IC-tagged printing paper 210 wherein an IC tag 212 is embedded on a part of printing paper 211, and image data (original image data) concerning image 220 is recorded on IC tag 212 of IC-tagged document 200.

Printing paper 211 is a printing medium of a sheet form made of paper, cloth, plastic material, metal or others.

IC tag 212 is a non-contacting type electronic tag using wireless communication equipped with a memory unit (not shown) consisting of IC chips and an antenna unit (not shown) consisting of a coil built inside the chip, conducts wireless communications with IC tag readers 143A and 143B, or IC tag writer 152 by means of electromagnetic induction coupling receiving radio waves emitted by IC tag readers 143 and IC tag writer 152 to read and write electronic data. With the development of minute IC tags with a typical thickness of 0.25 mm, which can be embedded in printing paper, in recent years, it is expected that a large amount of information will soon be stored in IC tags as the memory capacities of IC chips are increasing rapidly. However, the electronic tag used in the present invention does not have to be a non-contacting type of tag mentioned above but rather can be any type of tag as long as it has a communication interface for transmitting and receiving electronic data and has a memory unit for storing electronic data, so that even a contact type IC tag that communicates through a contact point type communication interface can be used.

FIG. 4 is a diagram for describing the contents of the electronic data stored in IC tag 212. As can be seen from FIG. 4, the memory unit of IC tag 212 stores electronic data 300. Electronic data 300 is described in the XML format, and contains a header part 310 storing attribute information of IC-tagged document 200 such as a document ID specific to the document, a page number, whether it is allowed to make copies or not, and an image data part 320 storing the original image data concerning image 220 printed on IC-tagged printing paper 210. However, the type of the information and the format of the electronic data recorded on IC tag 212 are not limited to those examples.

Further, IC-tagged printing paper 210 shown in FIG. 3 is not limited to the format shown in the figure; for example, IC tag 212 can be as large as to cover substantially the entire surface of printing paper 211, or a plurality of IC tags 212 are distributed substantially over the entire surface of printing paper 211 to be embedded therein.

Figure 5:
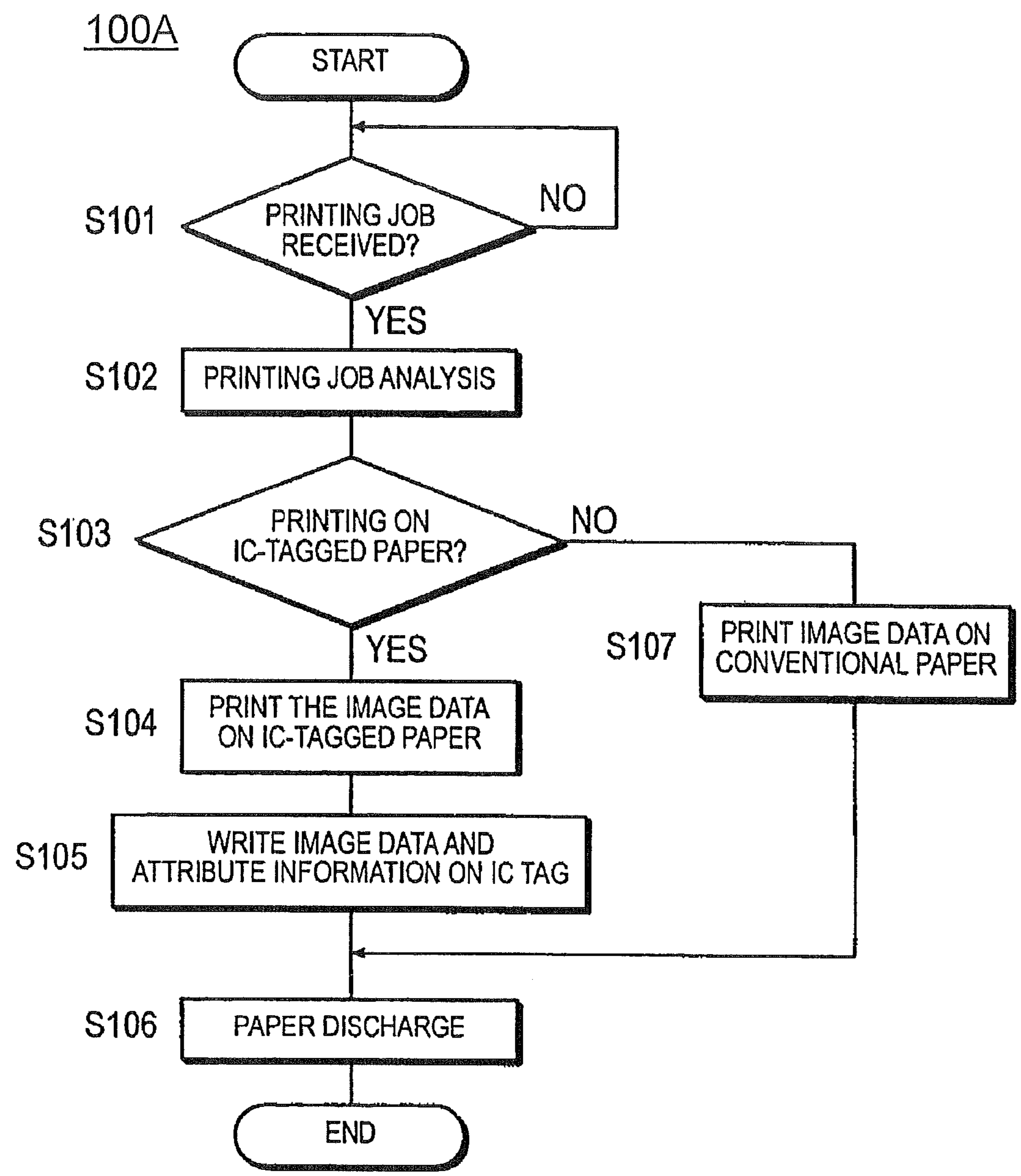
FIG. 5 is a flowchart showing the sequence of image forming process by means of MFP 100A.

Next, the outline of MFP 100A according to this embodiment will be described below. FIG. 5 is a flowchart showing the image forming process of MFP 100A according to this embodiment. The algorithm indicated by the flowchart of FIG. 5 is stored as a control program on memory 120 of MFP 100A, read out and executed by control unit 110 when the operation starts.

In FIG. 5, MET 100A waits for a printing job to arrive (S101: No). The user prepares a printing job using external equipment such as a personal computer and transmits it to MFP 100A. A printing job contains printing data written in a descriptive language that MFP 100A can understand and printing conditions such as the number of copies to be printed, the type and size of printing paper, etc.

Upon receiving a printing job via input interface 144 from external equipment (S101: Yes), MFP 100A stores the received printing job in memory 120. Next, it analyzes the received printing job (S102), and makes a judgment whether said printing job is related to printing on IC-tagged printing paper (S103). Whether a printing job is related to printing on IC-tagged printing paper or not is judged based on whether the printing mode specified in the printing condition included in the header of the printing job designates printing on the IC-tagged printing paper, or whether it is specified that the image data is to be written on the IC tag, or whether IC-tagged printing paper is specified as the printing paper for the job.

If it is judged in step S103 that the received printing job is related to printing on IC-tagged printing paper (S103: Yes), it rasterizes the printing data contained in the printing job, prints the image data (bitmap data) thus obtained on the IC-tagged printing paper according to the printing condition by means of printing unit 151 (S104), writes the printed image data and the attribute information on the IC tag of the IC-tagged printing paper after printing using IC tag writer 152 (S105), and discharges the paper to paper discharge tray 154 (S106). The image data to be written on the IC tag can be rasterized image data or the same data after it is compressed, or the printing data itself as it is contained in the printing job, or the data converted into a universal data format such as HTML, XML, PDF, JPEG, GIE, and TIFF.

If it is judged that the received printing job is not related to printing on IC-tagged printing paper in step S103 (S103: No), it rasterizes the printing data contained in the printing job, prints the obtained image data on normal printing paper according to the printing condition by means of printing unit 151 (S107), and discharges the printed paper to paper discharge tray 154 (S106).

Next, the outline of the actions of MFP 100B according to the second embodiment of the present invention will be described. MFP 100B is assumed here to have a similar constitution as MFP 100A according to said first embodiment (see FIG. 1 and FIG. 2). However, image input unit 140 of MFP 100B is only required to have optical scanning unit 142, and does not necessarily have to have input interface 144, ADF 141 or IC tag reader 143. Image output unit 150 does not necessarily have output interface 153.

Figure 6:
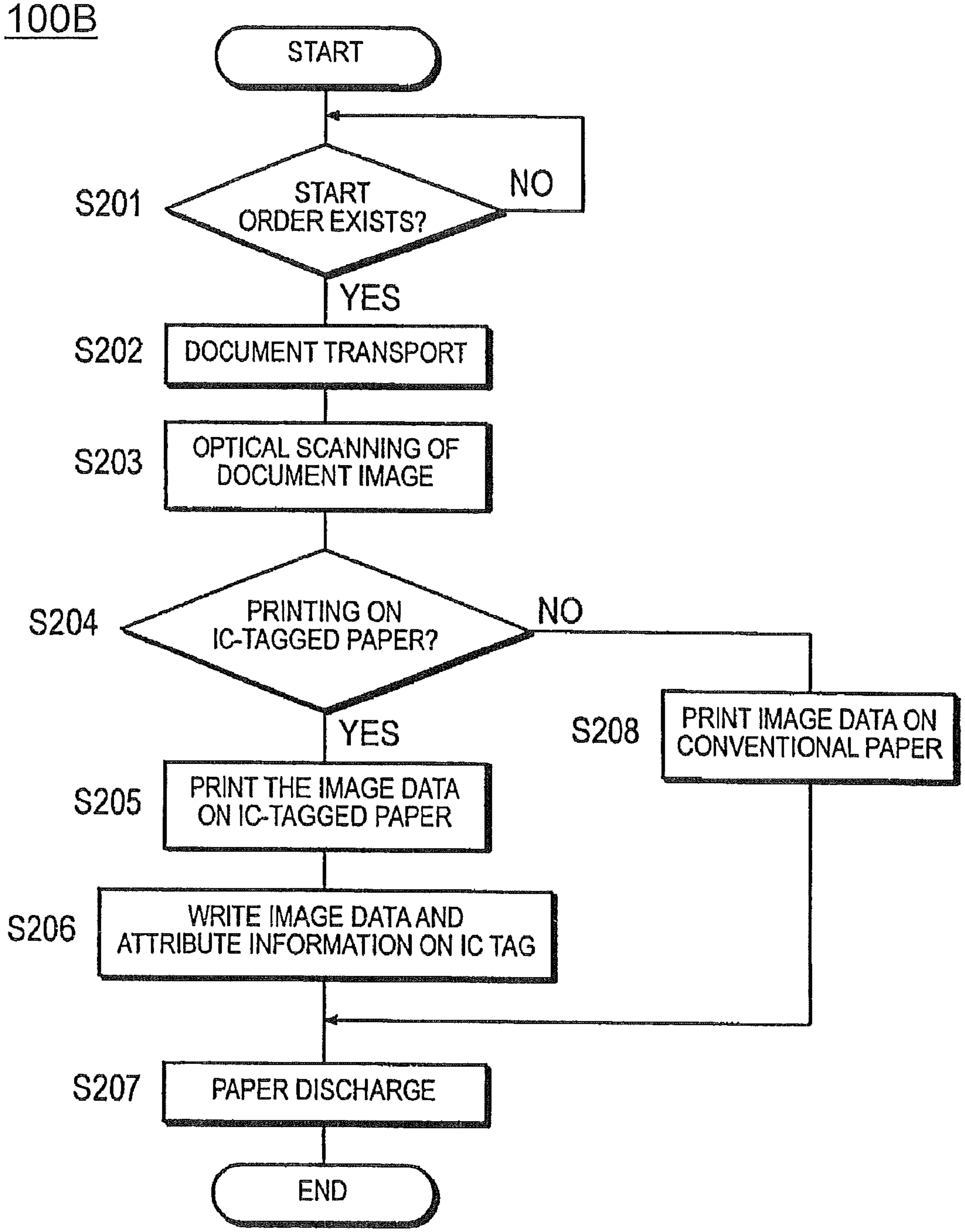
FIG. 6 is a flowchart showing the sequence of image forming process of an MFP 100B concerning a second embodiment of the invention.

FIG. 6 is a flowchart showing the image forming process of MFP 100B according to this embodiment. The algorithm indicated by the flowchart of FIG. 6 is stored as a control program on memory 120 of MFP 100B, read out and executed by control unit 110 when the operation starts.

In FIG. 6, MFP 100B stands by until it is ordered to start image processing (S201: No). The user sets the document on document tray 145, specifies the printing condition such as the number of copies to be printed and the type and size of printing paper by means of operating unit 130, and presses the start key.

Upon receiving an instruction for startup from operating unit 130 (S201: Yes), MFP 100B transports the document set on document tray 145 to a specified scanning position on document table 146 by ADF 141 (S202), scans the document image by optical scanning unit 142 and converts it to image data (bitmap data) (S203), and stores the image data to memory unit 120 after performing various image processes such as edge enhancement and density conversion. Next, a judgment is made as to whether said job is printing on IC-tagged printing paper (S204). Whether a printing job is related to printing on IC-tagged printing paper or not is judged based on whether the printing mode specified in the printing condition designates printing on the IC-tagged printing paper, or whether it is specified that the image data is to be written on the IC tag, or whether IC-tagged printing pare is specified as the printing paper for the job.

If it is judged in step S204 that the received printing job is related to printing on IC-tagged printing paper (S204: Yes), it prints the image data obtained in step S203 on the IC-tagged printing paper according to the printing condition by means of printing unit 151 (S205), writes the printed image data and the attribute information on the IC tag of the IC-tagged printing paper after printing by means of IC tag writer 152 (S206), and discharges the paper to paper discharge tray 154 (S207). The format of the image data to be written on the IC tag is identical to the format used in case of MFP 100A.

If it is judged that it is not related to printing on the IC-tagged printing paper in step S204 (S204: No), it prints the image data obtained in step S203 on conventional paper according to the printing condition by means of printing unit 151 (S208), and discharges the printed paper into paper discharge tray 154 (S207).

Next, the outline of the actions of MFP 100C according to the third embodiment of the present invention will be described. MFP 100C is assumed here to have a similar constitution as MFP 100A according to said first embodiment (see FIG. 1 and FIG. 2). However, image input unit 140 of MFP 100C does not necessarily have to have input interface 144, and output unit 150 does not have to have output interface 153.

Figure 7:
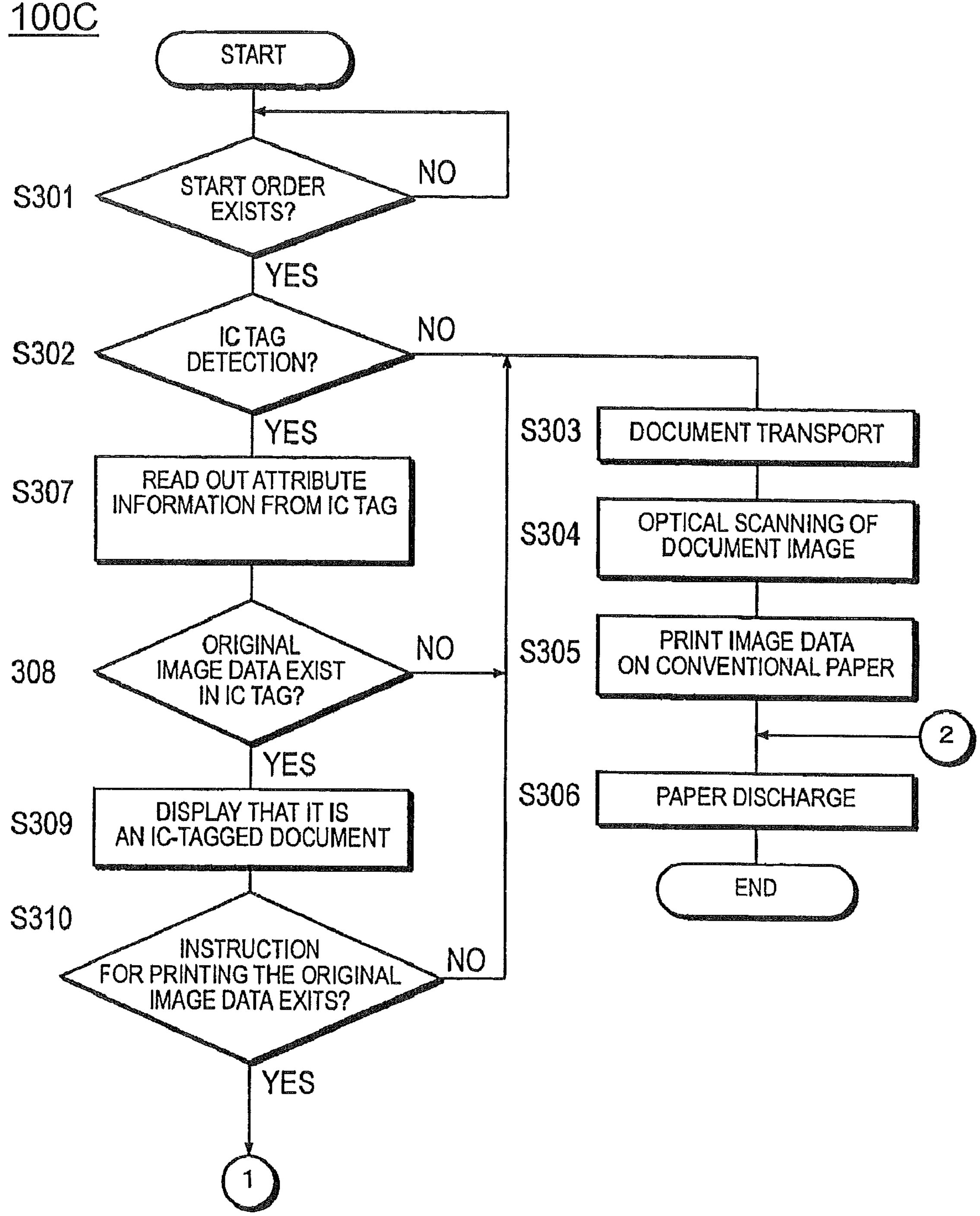
FIG. 7 is a flowchart showing the sequence of image forming process of an MFP 100C concerning a third embodiment of the invention.
Figure 8:
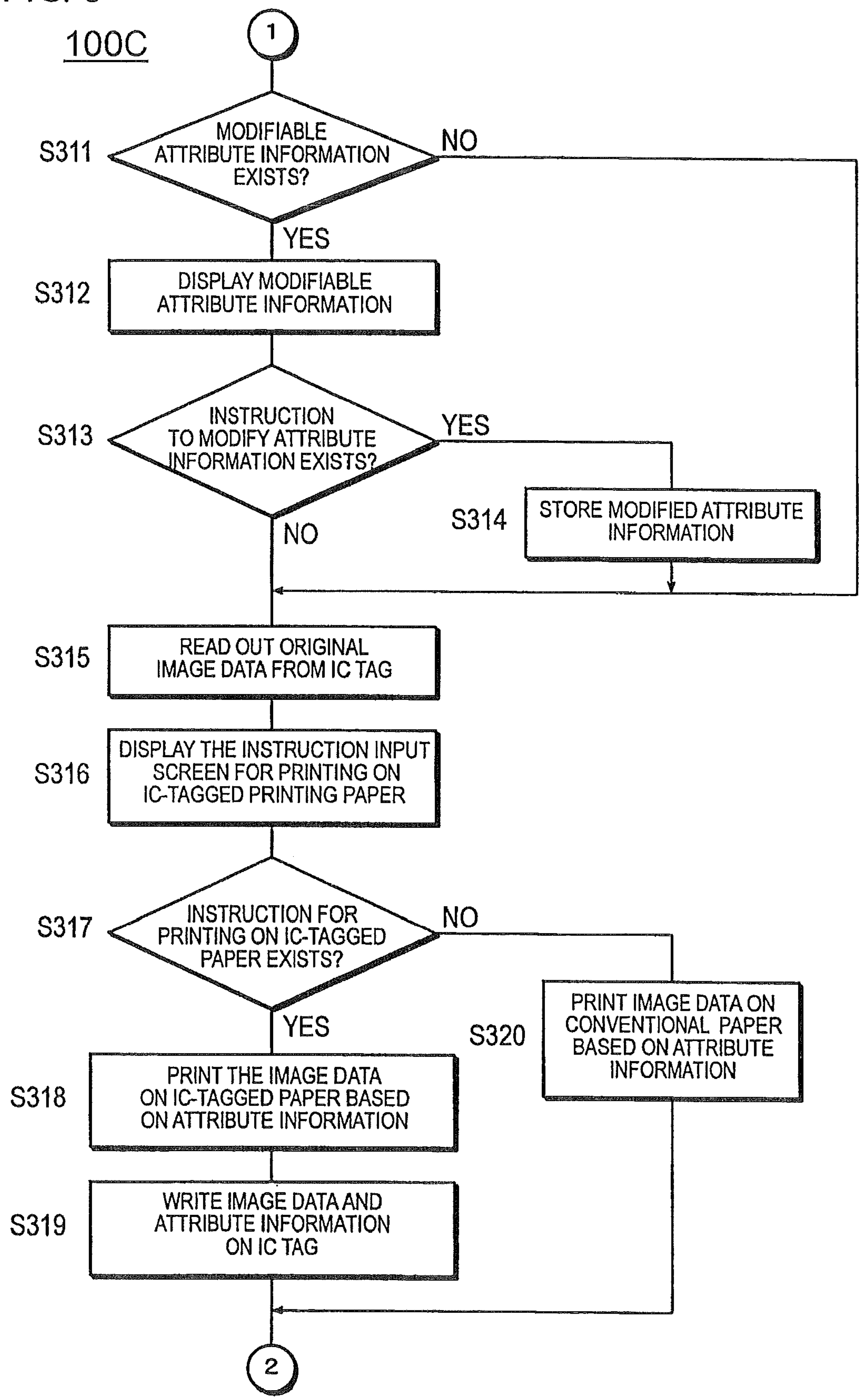
FIG. 8 is a flowchart showing the sequence of image forming process by means of MFP 100C.

FIG. 7 and FIG. 8 represent a flowchart showing the image forming process of MFP 100C according to this embodiment. The algorithm indicated by the flowchart of FIG. 7 and FIG. 8 is stored as a control program on memory 120 of MFP 100C, read out and executed by control unit 110 when the operation starts.

In FIG. 7, MFP 100C stands by until it is ordered to start image processing (S301: No). The user sets the document on document tray 145, specifies the printing condition such as the number of copies to be printed and the type and size of printing paper by means of operating unit 130, and presses the start key.

Upon receiving an instruction for startup from operating unit 130 (S301: Yes), MFP 100C searches IC tag of the document set on document tray 145 by means of IC tag reader 143A, and makes a judgment whether the document is an IC-tagged document or not (S302). If IC tag is not detected in step S302, it judges that the document set on document tray 145 is a normal document (S302: No), transports the document set on document tray 145 to the specified scanning position of document table 146 by means of ADF 141 (S303), scans the document image by optical scanning unit 142 and converts it to image data (S304), prints it on conventional paper according to the printing condition by means of printing unit 151 (S305), and discharges the printed paper into paper discharge tray 154 (S306).

If IC tag is detected in step S302, it judges that the document set on document tray 145 is an IC-tagged document (S302: Yes), and reads the attribute information of said document by means of IC tag reader 143A from the IC tag of the IC-tagged document set on document tray 145 to store it into memory unit 120 (S307). It further makes a judgment whether the original image data is stored in the IC tag of the IC tagged document by means of IC tag reader 143A (S308); if there is no original image data stored in the IC tag (S308: No), it transports the document same as in the case of conventional documents, optically scans the document, and prints the image data thus obtained (S303-S306).

If it is detected that the original image data is stored in an IC tag in step S308 (S308: Yes), it displays on the touch panel of control unit 130 by a screen 410 as shown in FIG. 9 that the document is an IC-tagged document and the original image data is stored in the IC tag (S309), and accepts an instruction on whether the original image data on the IC tag is to be printed or not (S310). If it receives an instruction for not printing the original image data (S310: No), it transports the document same as in the case of a conventional document, and prints the image data obtained by optically scanning (S303-S306).

On the other hand, if it receives an instruction for printing the original image data in step S310 (S310: Yes), it makes a judgment as to whether there is any attribute information that is modifiable among the attribute information acquired in step S307 (S311). In some cases, the attribute information recorded on the IC-tagged document may contain attribute information that is modifiable, and in such cases, information that shows which attribute information is modifiable is included in attribute information. MFP 100C is capable of judging whether there is any modifiable attribute information by searching such information from the acquired attribute information. For example, in case of electronic data 300 of FIG. 4, it is shown that, of the attribute information of "modifiable attribute" tab, image data's color, resolution, font size, font color, and font type are modifiable.

If there is any modifiable attribute information (S311: Yes), it displays the modifiable attribute information on the touch panel of operating unit 130 (S312) as shown in screen 420 of FIG. 10, and accepts an instruction on whether the modifiable attribute information is to be modified or not (S313). If it receives an instruction for modifying the attribute information (S313: Yes), it displays as exemplified in a screen 430 of FIG. 11 an attribute information modification input screen on the touch panel of operating unit 130 for accepting attribute information modification input, and stores the attribute information after the modification on memory unit 120 (S314). If it receives an instruction for not modifying the attribute information in step S313 (S313: No), the sequence of step S314 will be omitted. If the attribute information acquired in step S311 does not contain any modifiable attribute information (S311: No), the procedures of steps S312-S314 will be omitted.

Figure 12:
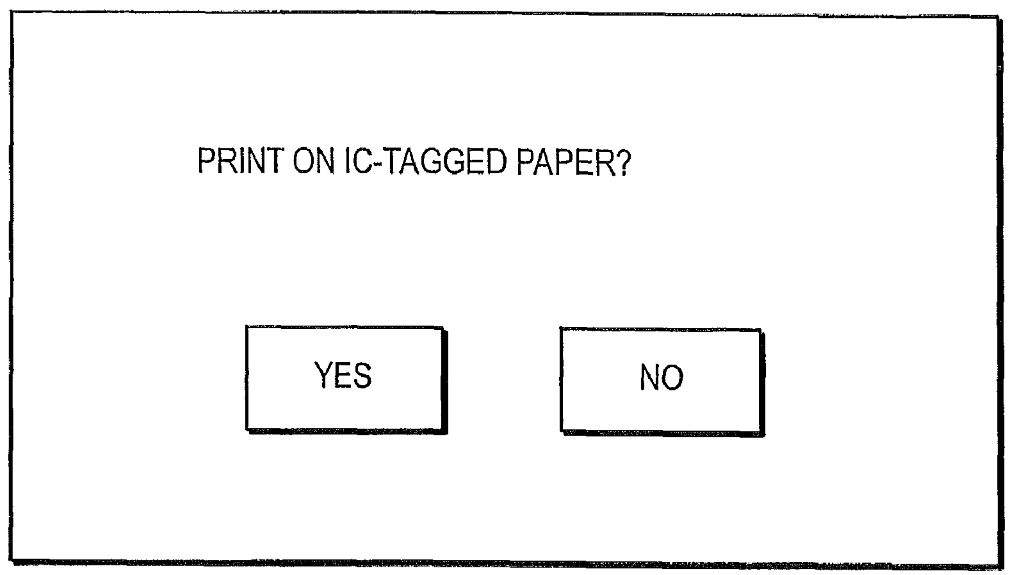
FIG. 12 is an example screen to be displayed on a touch panel of operating unit 130 of MFP 100C.

It then reads the original image data from the IC tag of the IC-tagged document set on the document tray 145 by means of IC tag reader 143A and stores it to memory unit 120 without transporting the document (S315). It displays a printing instruction input screen for printing on IC-tagged printing paper on the touch panel of operating unit 130 as shown in screen 440 of FIG. 12 (S316), and accepts an instruction input of whether it should be printed on the IC-tagged printing paper or not (S317). If there is a printing instruction for printing on IC-tagged printing paper in step S317 (S317: Yes), it prints the original image data on IC-tagged printing paper by means of printing unit 151 based on the attribute information stored in memory unit 120, i.e., prints the modified attribute information if the attribute information is modified in step S313, or prints the attribute information read from the IC tag of the document if the attribute information is not modified in step S313 (S318), writes the image data printed in step S318 and the attribute information on the IC tag by means of IC writer 152 (S319), and discharges the printed paper to paper discharge tray 154 (S306).

On the other hands, if there is no printing instruction to print on IC-tagged printing paper in step S317 (S317: No), it prints the image data on conventional printing paper based on the attribute information stored in printing unit 120, in other words, based on the modified attribute information if the attribute information is modified in step S313 (S320), and discharges the printed paper to paper discharge tray 154 (S306).

The invention is not limited to the embodiment described above, but also can be changed in various ways within the scope of the claims.

For example, in each of the embodiments described above, image output unit 150 can be so constituted not just to print the image data on IC-tagged printing paper or conventional printing paper by means of printing unit 151 or to write it on the IC tag of the IC-tagged printing paper by means of IC tag writer 152, but also to transmit it to external equipment via output interface 153.

Although it was described the image forming device according to the present invention as being an MFP in each of the above embodiments, MFP 100A can be a printer dedicated for preparing IC-tagged printed matter (printing on IC-tagged printing paper), and MFP 100B can be a copying machine dedicated for preparing IC-tagged printed matter (copying on IC-tagged printing paper). Also, MFP 100C can be a copying machine dedicated for copying IC-tagged printed matter (copying to conventional printing paper from IC-tagged printed matter) or a copying machine dedicated for preparing IC-tagged printed matter (copying to IC-tagged printing paper from IC-tagged printed matter).

The image forming method and the image forming device according to this invention can be realized by a dedicated hardware circuit for executing the abovementioned steps, or by causing a CPU to execute a program where said steps are described. If the present invention is to be materialized by the latter means, said programs for operating the image forming device can be provided by computer-readable recording media such as a Floppy® disk and CD-ROM, or can be provided on-line via a network such as the Internet. In this case, the program recorded on the computer readable recording medium is normally transported to and stored in a memory device such as ROM and a hard disk. The program can also be provided as independent application software or can be built into the software of the image forming device as a part of its function.

As mentioned above, an electronically tagged printed matter according to the present invention, the attribute information and original image data of the printed matter are stored in the electronic tags so that the attribute information and original image data can be easily retrieved and used during copying processes.

Also, according to the image forming device of the present invention, an electronically tagged printed matter can be easily prepared by printing image data on electronically tagged printing paper and simultaneously writing the image data of the printed images on electronic tags of said printing paper.

Also, according to the image forming device of the present invention, since when copying an electronically tagged printed matter, it is possible to read out the attribute information and original image data of printed matter from electronic tags and use them, copies of high image quality can be obtained with simple systems not requiring any servers or networks. In particular, the use of electronically tagged printing paper makes it easy to copy an electronically tagged printed matter from an original electronically tagged printed matter.

According to the image forming device of the present invention, it is possible to identify automatically whether a document is an electronically tagged printed matter or not, and provides image data obtained by optically scanning if it is not an electronically tagged printed matter, or image data obtained by reading electronic tag if it is an electronically tagged printed matter, thus making it possible to provide appropriate processes in accordance with the type of document even if the user does not recognize the type of document.

Also, the image forming device of the present invention automatically identifies whether the document is an electronically tagged printed matter or not and, if the document is an electronically tagged printed matter, it skips the transport of the document by ADF and reads image data from the electronic tag of the document while it is set on the ADF, so that a high speed process is possible and damages or soiling of the document can be minimized.

Also, since the image forming device according to the present invention automatically identifies whether a document is an electronically tagged printed matter and indicates on a display that it is an electronically tagged printed matter if it is indeed so, the abovementioned function of an electronically tagged printed matter is offered without fail even when the user fails to note that it is an electronically tagged printed matter. Furthermore, since it allows the user to choose whether to use the image data stored in electronic tags or not when a document is an electronically tagged printed matter, the user can execute the process of the user's preference, for example, optical copying should be executed even if a document is an electronically tagged printed matter.

Also, according to the image forming device of the present invention, it is possible to indicate modifiable items among the attribute information of an electronically tagged printed matter, and add modifications to those attributes, so that it is possible to obtain copies reflecting attribute information modified according to the capability of said image forming device or the user's preference.

What is claimed is:

1. An image forming device, comprising: a reading unit for reading image data from an electronic tag of an electronically tagged printed matter wherein image data is printed on an electronically tagged printing paper equipped with the electronic tag for storing electronic data as image data in a certain part of the printing paper; a printing unit for printing the image data read by said reading unit; a judging unit for judging whether a document is said electronically tagged printed matter or not; a transporting unit for transporting the document to a specified position when said judging unit judges that the document is not said electronically tagged printed matter; a scanning unit for scanning image data of the document transported by said transporting unit; and a second printing unit for printing the image data scanned by said scanning unit, wherein said transporting unit does not transport the document when said judging unit judges that the document is said electronically tagged printing matter; and said reading unit reads image data from the electronic tag of the untransported document on said transporting unit when said judging unit judges that the document is said electronically tagged printed matter.

2. The image forming device of claim 1, wherein said electronic tag stores image data printed on said electronically tagged printing paper.

3. The image forming device of claim 2, further comprising: a display unit for displaying a notice that the document is an electronically tagged printed matter when said judging unit judges that the document is said electronically tagged printed matter; and a selecting unit for selecting whether the image data stored in the electronic tag of the document should be printed or not; wherein said reading unit reads out image data from the electronic tag of the document when said selecting unit selects that the image data stored in the electronic tag of the document should be printed.

4. The image forming device of claim 1, wherein said printing unit prints image data on an electronically tagged printing paper equipped with an electronic tag for storing electronic data in a certain part of the printing paper, further comprising: a writing unit for writing the image data printed by said printing unit on the electronic tag of the electronically tagged printing paper on which the image data is printed by said printing unit.

5. The image forming device of claim 1, wherein said electronic tag transmits or receives electronic data by means of wireless communications.

6. An image forming method, comprising: a reading step of reading image data from an electronic tag of an electronically tagged printed matter wherein image data is printed on an electronically tagged printing paper equipped with the electronic tag for storing electronic data as image data in a certain part of the printing paper; a printing step of printing the image data read by said reading step using a printing unit; a judging step of judging whether a document is said electronically tagged printed matter or not; a transporting step of transporting the document to a specified position when said judging step judges that the document is not said electronically tagged printed matter; a scanning step of scanning image data of the document transported by said transporting step; and a second printing step of printing the image data scanned by said scanning step using a second printing unit, wherein said transporting step does not transport the document when said judging step judges that the document is said electronically tagged printing matter; and said reading step reads image data from the electronic tag of the untransported document when said judging step judges that the document is said electronically tagged printed matter.

7. The image forming method of claim 6, wherein said electronic tag stores image data printed on said electronically tagged printing paper.

8. The image forming method of claim 7, further comprising: a display step of displaying a notice that the document is an electronically tagged printed matter when said judging step judges that the document is said electronically tagged printed matter; and a selecting step of selecting whether the image data stored in the electronic tag of the document should be printed or not; wherein said reading step reads out image data from the electronic tag of the document when said selecting step selects that the image data stored in the electronic tag of the document should be printed.

9. The image forming method of claim 6, wherein said printing step prints image data on an electronically tagged printing paper equipped with an electronic tag for storing electronic data in a certain part of the printing paper, further comprising: a writing step of writing the image data printed by said printing step on the electronic tag of the electronically tagged printing paper on which the image data is printed by said printing step.

10. An image forming method of claim 6, wherein said electronic tag transmits or receives electronic data by means of wireless communications.

11. A nontransitory computer-readable medium containing an image forming program for causing an image forming device to execute: a reading step of reading image data from an electronic tag of an electronically tagged printed matter wherein image data is printed on a electronically tagged printing paper equipped with the electronic tag for storing electronic data as image data in a certain part of the printing paper; a printing step of printing the image data read by said reading step using a printing unit; a judging step of judging whether a document is said electronically tagged printed matter or not; a transporting step of transporting the document to a specified position when said judging step judges that the document is not said electronically tagged printed matter; a scanning step of scanning the image data of the document transported by said transporting step; and a second printing step of printing the image data scanned by said scanning step using a second printing unit, wherein said transporting step does not transport the document when said judging step judges that the document is said electronically tagged printing matter; and said reading step reads image data from the electronic tag of the untransported document when said judging step judges that the document is said electronically tagged printed matter.

12. The nontransitory computer-readable medium of claim 11, wherein said electronic tag stores image data printed on said electronically tagged printing paper.

13. The nontransitory computer-readable medium of claim 12, wherein the program causes the image forming device to execute: a display step of displaying a notice that the document is an electronically tagged printed matter when said judging step judges that the document is said electronically tagged printed matter; and a selecting step of selecting whether the image data stored in the electronic tag of the document should be printed or not; wherein said reading step reads out image data from the electronic tag of the document when said selecting step selects that the image data stored in the electronic tag of the document should be printed.

14. The nontransitory computer-readable medium of claim 11, wherein said printing step prints image data on an electronically tagged printing paper equipped with an electronic tag for storing electronic data in a certain part of the printing paper, for further causing the image forming device to execute: a writing step of writing the image data printed by said printing step on the electronic tag of the electronically tagged printing paper on which the image data is printed by said printing step.

15. The nontransitory computer-readable medium of claim 11, wherein said electronic tag transmits or receives electronic data by means of wireless communications.

* * * * *